Feb. 2, 1960

C. R. TAYLOR 2,923,523

BUTTERFLY VALVE

Filed Feb. 8, 1957

INVENTOR
Charles R. Taylor

BY

ATTORNEY

United States Patent Office 2,923,523
Patented Feb. 2, 1960

2,923,523

BUTTERFLY VALVE

Charles R. Taylor, Lubbock, Tex., assignor of one-third to Wendell Coffee, Lubbock, Tex.

Application February 8, 1957, Serial No. 638,957

5 Claims. (Cl. 251—175)

This invention relates to valves for agricultural irrigation.

Often in irrigating row crops, use is made of gated pipe—i.e., a water carrying conduit transverse to the rows—from which header lateral tubes branch off for each row. Each lateral tube has a valve. This valve serves two purposes, first, to throttle the flow of some rows so that an even distribution is obtained; and second to completely shut off the flow to some rows in the event it is not desired to irrigate all rows.

Since a large number of these valves are used, it is essential that they be inexpensive. It is desirable that they completely eliminate the flow of water when closed.

An object of this invention provides a valve which will completely shut off the flow when closed.

Another object is to provide a valve which has a long life.

Further objects are to achieve the above with a device that is sturdy, simple, and reliable, yet cheap and easy to manufacture.

The specific nature of the invention as well as other objects, uses, and advantages thereof will clearly appear from the following description and from the accompanying drawing, in which.

Figure 1:
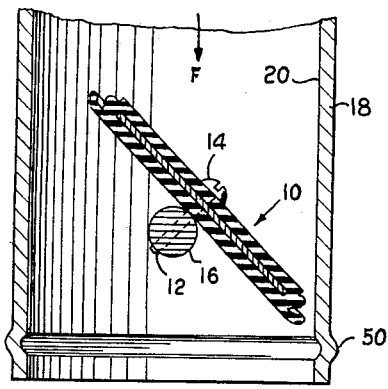
Fig. 1 is an axial section of the valve in place in the lateral tube.
Figure 2:
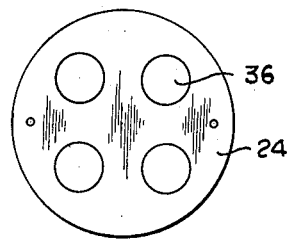
Fig. 2 is a plan view of the metal reinforcing disc.
Figure 3:
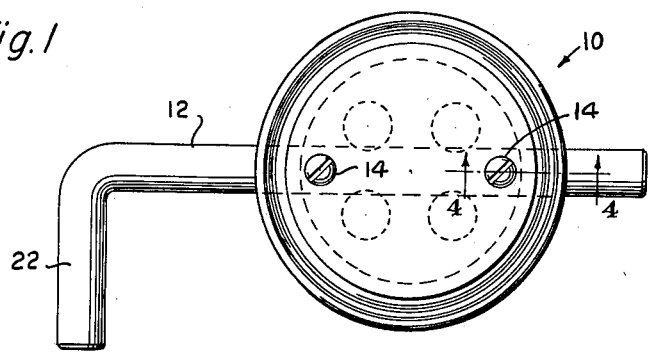
Fig. 3 is a plan of the valve disc attached to its shaft.
Figure 4:
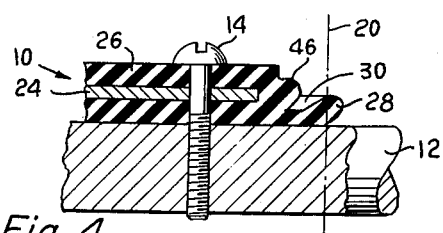
Fig. 4 is a partial axial section taken on line 4—4 of Fig. 3. The position of the inside wall of the tube is indicated by a phantom line.

As seen in the drawing, the valve or disc 10, is attached to shaft 12 by two screws or pins 14. The shaft passes through diametrically opposed holes 16 in tube 18. The holes are slightly larger than the shaft; it is not necessary that this be a water-tight joint. The tube has a cylindrical bore of circular cross-section 20. The shaft has a bent portion extending outside the tube which forms a handle 22. Bead 50 on the end of tube 10 stiffens the tube and provides means for attaching a "sock," not shown.

The valve or disc 10 comprises a stiffener or reinforcing disc 24 with a resilient covering 26. At the perimeter of the valve is bead or lip 28. On one face of the valve is annular groove 30 adjacent this lip. The diameter of the valve 10 is slightly larger than the inside diameter of the tube or bore diameter 20.

Figure 6:
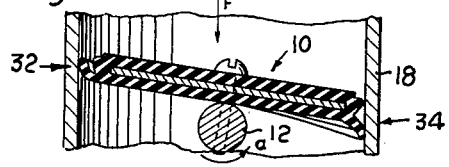
Fig. 6 is an axial section of the valve in place showing the distortion as it is moved to the closed position.
Figure 7:
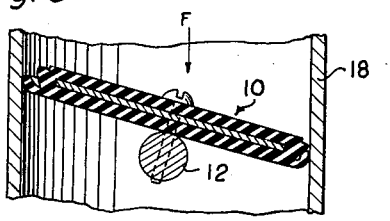
Fig. 7 is an axial section of the valve in place after it springs back into final closed position.

The purpose of the construction outlined above is for the valve to operate in the manner illustrated in Figs. 6 and 7. When the shaft 12 is rotated to cause the valve 10 to turn in the direction of arrow $a$ in Fig. 6, the lip is distorted due to frictional contact with the bore 20. On the side 32 which is moving down stream relative to fluid flow F, the lip is distorted away from the flat face of the valve which is attached to the shaft. On the side 34 which is moving upstream relative flow F, the lip is distorted back upon itself and toward the flat face.

When the turning movement on the shaft is released—i.e., the operator turns loose handle 22—the resilience of the covering in the vicinity of the lip causes the valve to rotate slightly in the direction opposite arrow $a$. Then the valve springs back to assume the position of Fig. 7. The lip on side 34 rolls back to its normal position. The lip all the way around the valve is pressed against the bore by the resilience of the material. Also the fluid pressure in groove 30 aids the lip in being sealed against the inside tube wall. The lip seals upstream from hole 16 and therefore there is no leakage at that point. When the valve is open, leakage is not critical because water is being released within a few inches of that point; also the leakage is quite small due to the low pressure and the fact that at all times the lip 28 is in contact with the wall just upstream of hole 16.

A specific construction which obtains the desired operation is:

The metal stiffener 24 has a diameter of about one-half inch less than the diameter of the bore 20. That is, if the bore is 2.400 inch diameter the stiffener would be about 1.900 inch. However, this dimension is not critical and it may be as much as a quarter inch less. There are a plurality of perforations 36 in the disc.

Rubber is the preferred covering for the metal stiffener and forms the disc 10 which is the valve. The rubber should be supple or flexible as well as springy. A mixture of natural and butyl rubber, with about two and a third times as much natural as butyl, has proven satisfactory. This has about the same characteristics as the rubber used in automobile tires. The rubber is cured or vulcanized for twenty minutes or more at a temperature of 300°–310° F. The perforations 36 provide a means for the rubber on either side of stiffener 24 to be bonded together.

Figure 5:
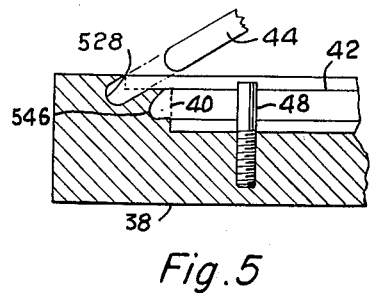
Fig. 5 is a partial axial section of the mold in which the valve is cast, showing how it is formed.

Mold 38 is made by cutting cylindrical cavity 40 (shown in broken lines of Fig. 5) about a quarter inch deep and about four-tenths inch less diameter than the bore diameter. Neither of these dimensions are critical. A cylindrical step 42 (also shown broken) is cut about one-sixteenth inch deep and the same diameter as the bore 20. A tool 44, about one-eighth inch wide with a semi-circular nose is advanced at an angle of about 60° to the axis of the cylindrical cavity 40. Thus annular groove 528 is formed; the diameter of which is about two-tenths inch greater than the bore diameter. Lip 28 is molded in groove 528. Therefore; there will be an annular bevel at the perimeter on the flat face of disc 10 at 30° angle to that face. The same tool 44 is used to cut an annular quarter round groove 546. The diameter of the groove 546 is about two-tenths inch less than the bore 20. Thus when the valve is cast the annular groove 30 between lip 28 and quarter round bead 46 will be about one-twentieth of an inch measured diametrically, i.e., along a diametrical line intercepting both the bead 46 and lip 28, about the center of the groove, the groove will measure one-twentieth of an inch wide. Along a diametrical line intercepting the extreme outer edge of the perimeter of the disc, the lip will measure about two-tenths of an inch wide. Stated otherwise, the thickness of the lip would be the measurement from one face of the lip to the other face, measured about the middle of the lip normal to the lip which would be along the line forming a 60° angle with a diametrical line. Thus measured, the thickness of the lip would be about one-tenth of an inch. When cast, the lip 28 does not have the exact thickness of the groove 528 in the mold in which it is cast. The diametrical lines are normal to the axis of the valve. Pins 48 are located in the mold and extend parallel to the axis of cavity 40. They serve the dual purpose of positioning the stiffener 24 while molding and forming holes in the covering for screws 14.

The essence of this valve is a supple, springy lip attached to a more rigid body which will operate in the manner described above.

It will be apparent that the embodiment shown is only exemplary and that various modifications can be made in construction, materials, and arrangement within the scope of the invention as defined in the appended claims.

I claim as my invention:

1. In a butterfly valve having a body with a cylindrical bore, a body having two openings diametrically opposed, a shaft rotatably mounted in said openings and a resilient disc of similar shape to the cross section of the bore mounted on the shaft for closing said bore; said resilient disc comprising in unstressed condition, a substantially cylindrical shaped resilient plate, a lip formed by an extension of a first flat surface of said resilient plate, said lip extending radially outward past the peripheral edge of said resilient plate and extending from said first surface outwardly toward a plane containing the second flat surface of said resilient plate, to form an annular groove between said lip and said peripheral edge, rotation of the disc to a first closed position distorting the trailing edge of said lip by frictional and resilient engagement with said bore, said engagement bending the trailing edge radially outward and away from the peripheral edge of said plate, said lip distortion causing a reactive resilient force to be exerted on said plate by said distorted lip to effect self rotation of said plate to a final closed position in a direction counter to the direction of said initial rotation, said lip being in peripheral engagement with said bore at said final closed position and being pressed by said bore radially inwardly toward said peripheral edge of said plate.

2. A butterfly valve as described in claim 1 wherein, said resilient disc is reinforced in the approximate center thereof by a metal stiffener plate, said metal plate being mounted on said shaft.

3. A butterfly valve as described in claim 1 wherein, said resilient disc is reinforced by a metal stiffener plate, said plate having perforations therein and being mounted on said shaft.

4. A butterfly valve as described in claim 1 wherein, said cylindrical shaped resilient plate has a bead peripherally connected thereto at a small distance below said second flat surface.

5. A butterfly valve as described in claim 1, wherein, a quarter-round bead is peripherally connected to said peripheral edge of said resilient plate at a small distance below said second flat surface, said bead having the bottom portion thereof sloping radially inward to join said peripheral edge, said annular groove defined by said lip and said bead bottom portion, said groove having a width dimension less than the thickness of said lip.

References Cited in the file of this patent

UNITED STATES PATENTS

| | | |
|---|---|---|
| 1,852,900 | Robinson | Apr. 5, 1932 |
| 2,059,687 | Gagg | Nov. 3, 1936 |
| 2,552,117 | Roswell | May 8, 1951 |
| 2,586,927 | Fantz | Feb. 26, 1952 |
| 2,695,625 | Ogle | Nov. 30, 1954 |
| 2,772,850 | Eaton | Dec. 4, 1956 |
| 2,816,729 | Jensen | Dec. 17, 1957 |

FOREIGN PATENTS

| | | |
|---|---|---|
| 678,619 | Great Britain | of 1952 |